United States Patent [19]
Schumacher

[11] 3,962,012
[45] June 8, 1976

[54] PROCESS FOR LAMINATING PRESSURE-SENSITIVE MATERIAL

[75] Inventor: Frederick George Schumacher, Wilmington, Del.

[73] Assignee: E. I. Du Pont de Nemours and Company, Wilmington, Del.

[22] Filed: June 28, 1974

[21] Appl. No.: 484,306

[52] U.S. Cl. ............................... 156/164; 156/324; 156/494; 156/550; 156/551
[51] Int. Cl.² ........................................ B32B 31/08
[58] Field of Search ........................... 156/156–160, 156/163, 164, 324, 494, 495, 496, 547, 548, 549, 550, 551

[56] References Cited
UNITED STATES PATENTS

| | | | |
|---|---|---|---|
| 3,150,024 | 9/1964 | Penman | 156/496 |
| 3,756,896 | 9/1973 | Kono | 156/164 |

*Primary Examiner*—William A. Powell
*Assistant Examiner*—Brian J. Leitten

[57] ABSTRACT

Improved process for laminating two sheets, the surface of the primary sheet being sensitive to distortion by pressure or friction, by applying an adhesive to the back side of the primary sheet or to the mating side of the secondary sheet, or to both, contacting the mating side of the secondary sheet with the back side of the primary sheet and firmly pressing together the two sheets while avoiding the application of any pressure to the pressure-sensitive face side of the primary sheet until at least 50 percent of the terminal bond strength is developed, by maintaining the primary and secondary sheets taut and applying pressure from the back side of the secondary sheet. Laminates prepared according to the above process, such as tufted carpets comprising a primary backing material stitched with closely spaced tufts of yarn and a secondary backing material adhered thereto with an adhesive, have improved pile lay characteristics.

17 Claims, 6 Drawing Figures

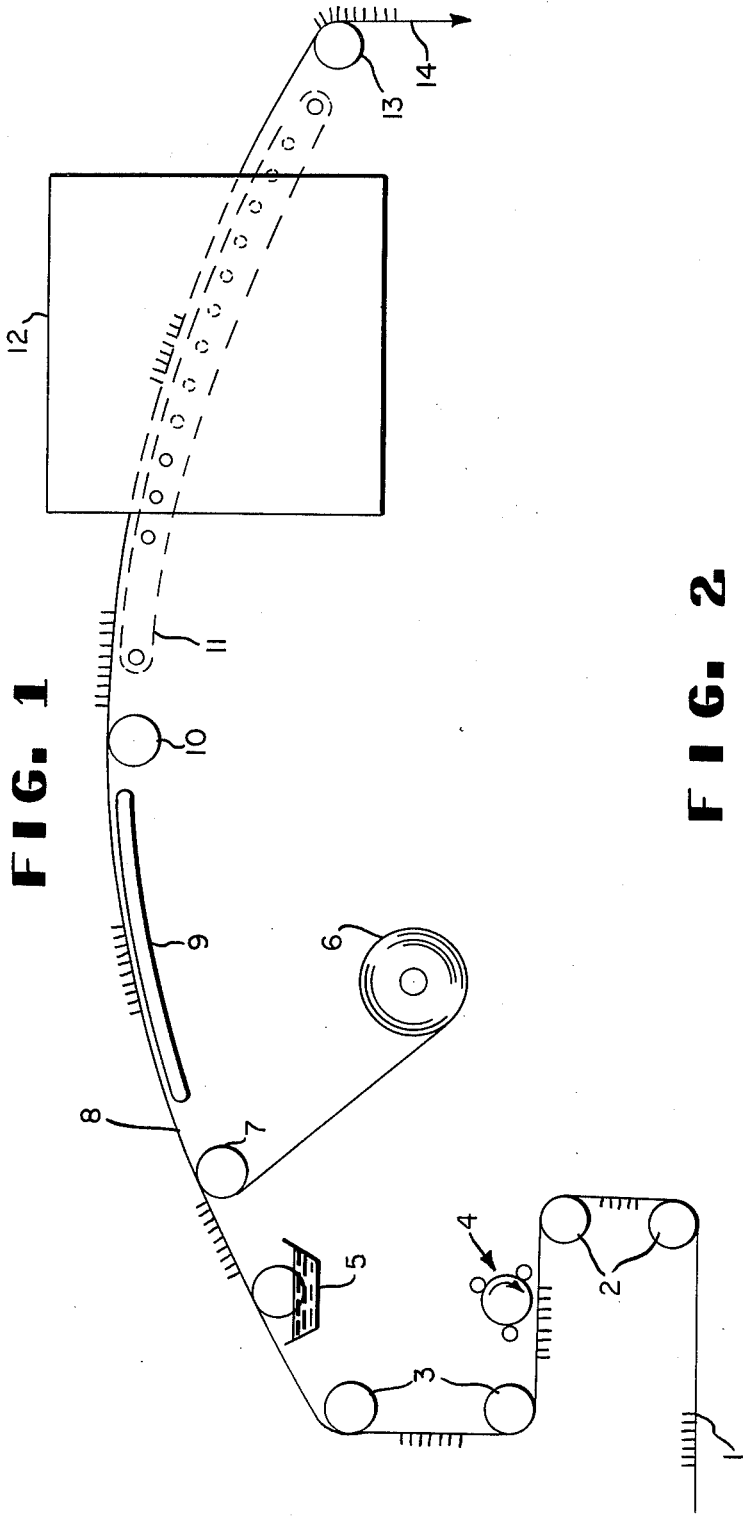
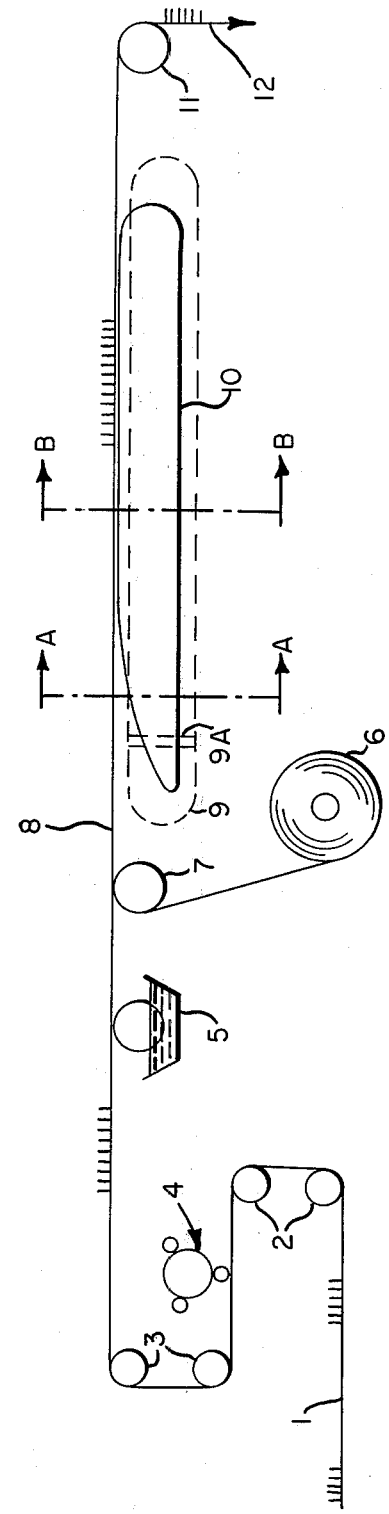

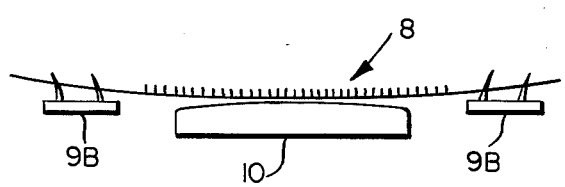
FIG. 2A
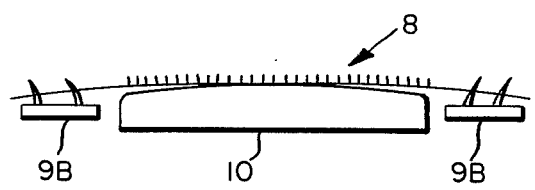
FIG. 2B
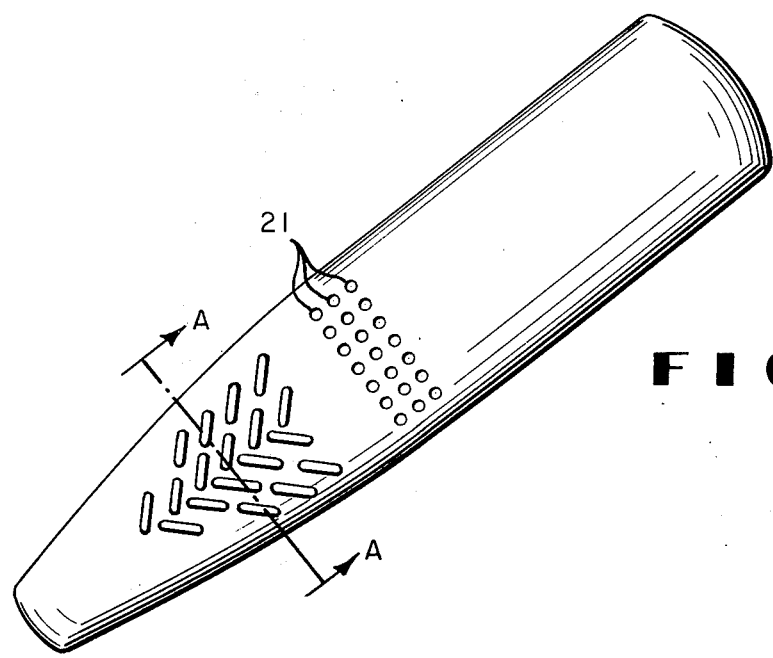
FIG. 3
FIG. 3A

PROCESS FOR LAMINATING PRESSURE-SENSITIVE MATERIAL

BACKGROUND OF THE INVENTION

1. Field of the Invention

This invention relates to a process for laminating two sheets wherein one has a pressure-sensitive surface and more particularly it relates to a process whereby the pressure required for contacting the two sheets is applied from the back side of the laminate.

2. Description of the Prior Art

Tufted carpet is made conventionally by use of specially designed machines which tuft loops of yarn into a suitable backing or "primary scrim" material such as woven jute, woven or spunbonded synthetic resins, etc. The loops may be left intact, or some or all may be cut. Also, the loops may be equal in size or may be at two or three different heights, depending upon the final desired effect. The tufted carpet is then usually dyed, by means of a "beck" or, alternatively, by continuous dyeing or printing of a design, or both, again depending upon the desired aesthetic effect. At this stage, while the unfinished carpet ("soft carpet") is aesthetically pleasing, it is not stable as individual tufts or loops are not firmly anchored to the primary scrim and can be removed by a very small force. Thus, it is imperative to use an adhesive to bond the structure. A commonly used method requires application of an adhesive to the back side of the "soft carpet," generally by use of a pan of adhesive plus a transfer roll, plus adding a secondary web ("secondary scrim") to the freshly applied adhesive on the primary scrim. The secondary scrim is customarily a woven sheet of lightweight jute, although use of other materials, such as woven or spunbonded polypropylene webs, is gaining in popularity. The final structure is now heavier, stiffer, and stronger, and will withstand many years of hard service without loss of tufts of face yarn, which are firmly held by the adhesive between two strong webs. Also, the bottom of the rows of stitches has been covered, which improves the appearance of the back side of the carpet.

When any two structures are glued together, the adhesive must "wet" both of the parts to be mated if a strong bond is to be formed. If one of the faces to be adhered is not well contacted by the adhesive, the final adhesive bond will be very weak. In laminating textile or other webs, it is common to use a set of squeeze or "nip" rolls which "marry" the final "sandwich" of primary scrim-adhesive-secondary scrim as shown in U.S. Pat. Nos. 3,551,231 and 3,684,600. The tackiness of the adhesive holds the structure together until the adhesive has set (dried, cured, or hardened) to form a strong bond between the primary and secondary webs.

Some of the adhesives used today are based upon an aqueous latex (emulsion or dispersion), which is cured by water removal plus, in some instances, chemical reaction. Plastisols or organosols (organic solvent based adhesives) may also be used. However, new adhesive types — the hot melts — are gaining in favor because these set rapidly as the melt congeals, do not require curing/drying ovens, operate at high line speeds, and thus conserve both utilities and labor. In all cases, whether a hot melt or a cold adhesive is used, it is imperative to secure intimate contact between the adhesive and both the primary and the secondary webs. As the adhesive is usually applied directly to the primary web, contact with it is excellent. But, it is also essential to be sure the secondary web is also well wetted. This is generally accomplished by adding the secondary web to the still wet and tacky primary web and then pressing the two webs firmly together. In a continuous process, such as in the lamination of textiles or, in particular, in the backcoating of carpets, the needed pressure is secured by use of one or more sets of nip rolls. Of necessity, this action transmits substantial pressure to both the face side and the back side of a carpet.

When the face side of the carpet passes under a nip roll, the pile of the carpet is crushed. In the case of a loop-pile carpet or a short plush carpet, the deformation is small and not readily noticed. However, the amount of pile distortion (pile forced backwards away from the flow of carpet) for a medium-cost or low-cost long shag carpet is appreciable and might cause an adverse reaction or a rejection by a prospective purchaser.

When pile distortion due to action of the top nip roll or other object which forces the pile backwards occurs, it can be corrected by means such as brushing. However, this is an attempt to correct an earlier mistake — and also introduces new problems. Brushed carpet has inferior tuft definition (i.e., individual tufts become fuzzy and seem to merge), and the fuzz created by the brush soon will plug up the brush, requiring a shutdown plus a slow cleanup operation. Other corrective means, such as air jets, air knives, heating, steaming, etc. can also be employed to correct pile lay. These too have drawbacks, such as pile disturbance, equipment cost, moistening of carpet, high utilities needs, etc. Thus, it is better to avoid the pile distortion problem entirely than to try to correct the problem later.

To eliminate this problem U.S. Pat. No. 2,675,337 (Walker et al.) suggested means to avoid pile flattening by "uniting the fabrics under a pressure that is applied by drawing them both together under tension round a curved surface" (Col. 3, Lines 19–21). However, as indicated in Col. 3, lines 64–70, part of the time the web is under substantial forces applied by rollers 19 and 23 (FIG. 3). With a pressure-sensitive surface and a partly-adhered backing, rollers 19 and 23 would cause pile lay in carpets. Rollers 19 and 23 are essential for Walker's system, if they were removed from his apparatus, his system would become inoperative. Thus, it is apparent that Walker did not recognize the need to avoid all pressure and frictional drag once the adhesive was applied.

SUMMARY OF THE INVENTION

According to the present invention there is provided in a process for laminating a primary and a secondary sheet, the face side of the primary sheet being subject to distortion by pressure or friction, such process comprising applying an adhesive to the back side of the primary sheet or to the mating side of the secondary sheet, or to both, contacting the mating side of the secondary sheet with the back side of the primary sheet, pressing the primary and secondary sheets firmly together and setting the adhesive, the improvement comprising pressing the primary and secondary sheets firmly together, while avoiding the application of any pressure to the face side of the adhesive containing primary sheet until at least 50 percent of the terminal bond strength is developed, by maintaining the primary and secondary sheets taut and applying pressure from the back side of the secondary sheet by pressure means to prevent distortion of the face side of the primary sheet.

Further provided according to the present invention is a laminate, produced by the above process, of two sheets, the surface of one of such sheets being subject to distortion by pressure, the laminate thus produced having improved surface characteristics on its face side in respect of reduced distortion.

According to a still further embodiment of the present invention there are provided tufted carpets having improved pile distortion characteristics and the process for their preparation.

DESCRIPTION OF THE DRAWINGS

FIG. 1 schematically depicts an array of apparatus which can be used to carry out the process of the present invention.

FIG. 2 schematically depicts an alternative set of apparatus to carry out the present process.

FIG. 2A schematically depicts the cross-section at A—A of the apparatus of FIG. 2.

FIG. 2B schematically depicts the cross-section at B—B of the apparatus of FIG. 2.

FIG. 3 schematically depicts the surface design of a pressure means that can be employed in the process of the present invention.

FIG. 3A schematically depicts the cross-section at A—A of the pressure means of FIG. 3.

DETAILED DESCRIPTION OF THE INVENTION

The present invention applies generally to the lamination of any two sheets wherein one surface of one of such sheets is subject to distortion by pressure or friction (face side) which might render the final product aesthetically or otherwise objectionable. Of course, the sheets must be flexible enough to conform to the pressure means (such as mandrels, etc.) applied. Possible examples are shag carpets, flocked cloth or paper, carbon (duplicating) paper, "Polaroid" self-developing film packs (manufactured by the Polaroid Corp.), polished metal films, easily-marred films, fake fur textile laminates, other composites, etc. Although the invention is of such general applicability, and can be applied to multi-ply structures also, it will be discussed in more detail in terms of pile fabrics and more specifically, in terms of tufted carpets.

We have found a novel method which enables effecting a good "marriage" of the adhesive and the primary and secondary carpet scrims, without requiring the application of any external force to the face side of the carpet pile. This is accomplished by applying the adhesive to the back side of the "soft" carpet and then adding the secondary scrim by using only a single roll rather than a nip roll set. The requisite force to merge the two sheets is secured by holding the sheets taut and applying pressure from the back side only. No added pressure is employed to the face side of the adhesive containing primary sheet until at least 50 percent of the terminal bond strength is developed. Terminal bond strength is the strength of bond between top and bottom sheets as measured at end of regular manufacturing cycle, e.g., at time of wrapping, shipping, etc. This could be measured as tuft bind or peel strength, i.e., scrim bond of carpet, or as T-peel strength (paper-formica) or as shear strengths, etc. Pressure can result from passing over a curved surface, such as a roll, a drum, or a platen. A flat pressure-inducing surface can also be employed by holding the goods firmly at both edges and then elevating the pressure-inducing surface slightly higher than the plane of the goods. A still further increase in local pressure can be secured by adding raised areas — pressure points — to the pressure-inducing surface. Such pressure points will create substantially higher bond strengths than can be secured by a flat surface or a continuously curved surface without the raised areas.

In the standard arrangement heretofore used for lamination of textiles and, in particular, for lamination of carpets, the tufted, dyed, and dried carpet passes with the pile face upwards over one or more lick rolls (or other appropriate adhesive applicator), to produce a wetted bottom surface containing an appropriate amount of adhesive from a storage pan. Auxiliary adhesive rate control devices are also commonly used — such as a doctor blade to meter the adhesive onto the roll or a blade to remove excess adhesive from the back side of the carpet. These do not affect the principles of the present invention. The secondary scrim, commonly lightweight jute, is fed from supply rolls and in some instances, additional rolls can also aid in "marrying" the layers of the sandwich. Thus, all needed ingredients are brought together, but the bond is weak and still fluid. Further processing is then required, which will vary depending upon whether goods are laminated by latexing or by a hot-melt process.

Completion of the lamination process with carpet adhesives of the latex type have heretofore been carried out as follows. The uncured carpet is pinned onto a stretching device such as a conventional tenter frame and held taut until the cure is completed (until the adhesive is set). The tenter generally has a hinged initial section which serves to stretch the goods progressively until the final width is secured. The taut but weakly bonded carpet "sandwich" is then squeezed firmly by a nip roll set, dried and/or cured in a heated oven, and the final carpet, firmly bonded, is discharged by a pull roll. The goods are then ready for shearing, inspection, wrapping, etc. by conventional equipment not germane to the present invention.

The heretofore used process for hot-melt laminated carpets differs from that described above in the following details:

a. Prior to tentering, the carpet passes over one or more retention/chilling plates.

b. One or more sets of nip rolls may be employed to ensure thorough wetting of both the primary and secondary scrims by the hot-melt adhesive.

c. A cool-out box may be employed to hasten the setting of the thermoplastic adhesive by blowing cold air onto either the top or bottom of the carpet, or both. Once the final carpet has been discharged by a pull roll, the goods are sheared, inspected, wrapped, etc. by conventional equipment.

The improvements of the present invention in the lamination process are shown in FIGS. 1, 2, and 3. FIGS. 1 and 2 show two different arrangements to secure the desired result, i.e., a well bonded carpet which has excellent pile appearance because there has been no face contact with pressure rolls or other face-disturbing elements once the adhesive has been applied.

In FIGS. 1 and 2 the tufted, dyed, and dried unbacked carpet 1 passes over guide rolls 2 and 3 in a manner which provides taut carpet for treatment by back-beaters 4. Rolls 2 do touch the face of the carpet; but, because no adhesive or backing material is present, any face disturbance is readily removed by backbeaters 4. Such means to secure erect pile for carpet 1 from the dyeing and drying (and sometimes preinspection) steps, where folds or wrinkles frequently occur, is a well known, commonly practiced procedure. Then, as has been described earlier, the back side of the soft carpet is given a coating of adhesive by applicator 5, and the mating side of the secondary backing 6 is "married" to the primary scrim at roll 7 to produce a weakly bonded structure 8 with the adhesive as yet unset. From this point, alternative approaches are possible to ensure obtaining a carpet with high final bond strength without applying pressure, frictional drag or other external force to the face side of the carpet which would disturb the appearance of the carpet pile.

As shown in FIG. 1, the weakly bonded carpet 8 passes over a continuously curved supporting surface 9 (retention/chill plate) which may be heated or cooled, depending upon the nature of the adhesive and whether it is desired to hasten or retard the setting of the adhesive. The action of tenter frame 11 and pull roll 13 will cause a downward force to result on the carpet, forcing the primary scrim and the secondary scrim tightly together. The bonding action can be enhanced by appropriate design of roll 10 which can be spirally wound and driven to spread the goods and apply high local force to succeeding areas of the structure. Roll 10 can also be knurled or otherwise made uneven in surface character to provide high localized pressure from the bottom side. Similarly, tenter frame 11 can be built along an arc if added binding force is desired during the curing step in equipment piece 12. Equipment piece 12 will be a heated oven for water-based or solvent-based adhesives or will be a cool-out box when hot-melt adhesives are employed. Finally, carpet 14 with good face appearance and a strongly bonded secondary backing is discharged by pull roll 13.

The equipment arrangement shown in FIG. 2 may prove attractive where space considerations are important and drying ovens or a cool-out box is not readily available. Here the weakly bonded carpet 8 is first picked up by platen 10 (retention/chill plate) once the carpet structure is close to hinge 9A and is thus close to full width. Sections A—A (FIG. 2A) and B—B (FIG. 2B) show how platen 10 progressively supports the carpet as it passes down tenter frame 9. At section A—A the carpet is supported only at the selvages by pin clips 9B or equivalent clamps, and forms a downward catenary due to its own weight. Platen 10 first just touches the carpet but progressively picks up more and more of the load until section B—B is reached, where the plane of the carpet 8 is higher than the plane of pin clips 9B which keep the carpet taut. Eventually the final carpet 12 is removed from the tenter frame 9 by the action of pull roll 11.

As the carpet passes down the tenter frame, platen 10 exerts a modest but steady pressure on the back of the secondary sheet. This provides excellent fixed contact between the sheets. FIG. 3 shows one of many configurations possible for the platen 10 of FIG. 2. From inlet to outlet, gentle curvature along the length will allow smooth pickup and discharge of the carpet, and thus minimum bond disturbance. Also, curvature from side to side will permit uniform side-to-side tension (and thus uniform back-applied pressure) on the carpet. The force can be considerably increased locally by addition of "pressure points," as shown on FIG. 3 and at section A—A on FIG. 3A. The design of the pressure points, the size, and their elevation above the plane of the platen can take many forms, depending upon the characteristics and strength of the webs selected. Other features may also be incorporated in the platen:

a. Heating and/or cooling sections can be added to dry and cure latex adhesives or to congeal hot-melt adhesives. Equipment length and final design are dependent upon carpet manufacturing rate and carpet construction.

b. One or more air streams can be utilized to apply added pressure to the back side of the carpet. The air would be supplied through holes 21 in the upper platen surface as shown on FIG. 3. Holes could be located in the pressure point areas if desired. Location of the holes, the number of holes, and air temperature and pressure will be dependent upon the carpet manufacturing rate and construction. In addition to providing heating and/or cooling, the air stream will also serve to reduce friction between the carpet and the platen.

c. While the platen is shown as one large piece, it is understood it may also be constructed in several smaller sections for ease in manufacture, installation, and repair or replacement.

d. While not shown in FIG. 2, it is also possible where desired to employ an oven or a cool-out box together with tenter frame 9 and platen 10 in order to hasten setting of the adhesive.

e. To conserve space and reduce investment the retention/chill plate may be provided with built-in pressure points. The carpet would be tentered immediately after "marriage," while passing over such a combination plate. Thus, the carpet could be cooled and strong bonds built, under controlled tension, in a single equipment piece.

EXAMPLES

In the examples below, except for the prior art latexed fabrics, shag carpets were laminated by use of the "Hotbac" backsizing method. The carpets were conventional shag styles, obtained commercially having a nylon pile about 1 inch high, and containing about 10 to 20 yarn tufts per square inch. The effects described are encountered whether the carpet primary scrim is of jute or of a woven synthetic type, e.g., polypropylene. Other changes to the primary backing material, such as inclusion of needle-punched nylon for aesthetic reasons, are also not significant.

A. Comparative Prior Art Fabrics

1. Latexed

Prior art latexed fabrics were obtained from commercial sources. The process used to make them was similar to that described earlier employing nip rolls to squeeze the weakly bonded carpet "sandwich." The top nip roll induced considerable pile layback; however, this was largely dissipated upon passage through the oven by the standard 7–10 minute exposure to a warm, moist air current. The final pile appearance would be rated 8–10 on the scale given in Table I.

2. Hot-melt

Comparative samples of hot-melt finished carpet were made from several essentially identical lots of unlaminated carpet. In so doing, the apparatus used commercially was similar to that described above in the discussion of the prior art hot-melt lamination of carpets. In some instances, the comparative samples were made in the laboratory by a similar procedure. In the laboratory set up the tenter frame and the cooling box were omitted as they are unnecessary in conducting trials on a laboratory basis. The nip rolls induced a marked "pile lay," i.e., the pile was forced in a backward direction by the pressure and frictional drag of the rolls. While much of the pile lay effect disappeared during further processing of the carpet, some residual effect generally remained. The final pile appearance would be rated from 4 to 8 on the scale in Table I. Where the carpet construction featured relatively few, e.g., 12 stitches/square inch, ratings below 4 have been noted. Thus, for certain carpet styles, the carpet produced by the hot-melt route would be at a competitive disadvantage from an appearance viewpoint.

TABLE I

| Scale Value (10 = Best) | Angle of Repose; Degrees Off Vertical | Description of Face Appearance |
| --- | --- | --- |
| 10 | Less than 5° | No perceptible directional pile lay. |
| 8 | From 5° to 10° | Directional lay noticeable to trained viewer. |
| 6 | From 10° to 20° | Untrained viewer may note directional lay, but will not react adversely. |
| 4 | From 20° to 30° | Directional lay noticeable to untrained viewer. Some will react negatively. |
| 2 | Greater than 30° | Directional effect obvious. Salable primarily to price-conscious purchasers only. |

B. Fabrics Produced by the Improved Method of the Present Invention

An apparatus such as shown in FIG. 1 is constructed. For laboratory scale tests using carpet widths of 15 to 18 inches it is convenient to eliminate tenter frame 11 and cool-out box 12. However, the carpet should not be released from tension until the melt has cooled to below 120°F. For larger widths, particularly for typical 12 ft. wide millgoods, the use of tenter frame 11, or of an equivalent, is advisable. The carpet and jute supplies are threaded up as shown on FIG. 1. A 10 to 15 ft. long lead in and tail out sheet of jute are used to help thread the machine. A hot melt composition suitable for back-sizing of carpets is added to pan 5. A suitable blend is described, e.g., in U.S. Pat. No. 3,745,054, as "60 percent blend No. 3", Table I, containing 8.1 percent of ethylene/vinyl acetate (E/VA) copolymer (25 percent vinyl acetate, 19 melt index), 0.9 percent of 149°F. AMP melt point fully refined paraffin wax, 1.3 percent of "Polyethylene AC8" (Allied Chemical Corp. — 240°F. melting point polyethylene wax, having an average molecular weight of 3500), 5.3 percent of microcrystalline wax, 12.1 percent "Piccopale" 100SF (Pennsylvania Industrial Chemical Corp.'s aliphatic thermoplastic petroleum hydrocarbon resin, softening point 225°F.–235°F., specific gravity 0.97), 12.1 percent of "Piccovar" AP25 (Pennsylvania Industrial Chemical Corp.'s dicyclopentadiene alkylation polymer, softening point 71°F.–83°F., specific gravity 0.97, 0.2 percent of BHT antioxidant and 60 percent of No. 9 Whiting calcium carbonate filler. When the hot melt blend reaches operating temperature (300°–320°F.) the line is started. A line speed of 30 ft./min. (laboratory) is convenient and reasonably simulates commercial speeds. The carpet and jute supply rolls are snubbed as necessary to keep the carpet tension at discharge at from 1 to 3 pounds/inch of carpet width—although higher values should not defeat the intent of the invention. For laboratory work, roll 13 was used, with a sand paper cover, to pull the carpet at a controlled speed. For laboratory tests short runs are preferred, using a 10 to 12 ft. length of carpet per trial. The carpet flow is stopped when the trailing edge clears supporting surface 9, but the carpet is kept taut between cooling surface 9 and pull roll 13 until the melt is below 120°F. The finished carpet is then removed for rating of face appearance and effectiveness of bond formation.

Three series of runs were made. In the first series (samples 1–4), the supporting surface 9 was water cooled to hasten the setting of the adhesive and was continuously and smoothly curved. Pressure points were not used. The data given in Table II corresponds to a scrim bond value of about 6 pounds/3-inch strip, for a 27 oz./yd.$^2$ hot-melt add-on, which just meets the typical industry minimum goal of 6 pounds/3 inches. In all cases, the pile was erect and was rated 8 to 10, depending upon the sample and the rater.

In the second series of runs (samples 5–8) pressure points were added to the front one-third of supporting surface 9. This series covered the same range of melt add-on as the first series. Again, the carpet pile was erect and was rated at 8–10, fully equivalent to latex-backed goods. However, the scrim bond now reached nearly 9 pounds/3 inches at about 27 oz./yd.$^2$ hot-melt add-on over 40 percent higher than for the first series of runs.

A third series of runs was made to show that good face appearance could be attained with other shag carpet constructions. The carpet types included both higher and lower face yarn weights, and included both woven jute and woven polypropylene primary scrims. In all cases, the no-face-contact method produced carpet with a pile appearance rating of 8 to 10.

TABLE II

| Sample | Melt Add-On oz./yd.$^2$ | Scrim Bond lb./3 in. |
| --- | --- | --- |
| 1 | 30.4 | 8½ |
| 2 | 39.0 | 11½ |
| 3 | 34.9 | 7½ |
| 4 | 23.4 | 5½ |
| 5 | 14.0 | 4½ |
| 6 | 26.9 | 8¾ |
| 7 | 26.6 | 10¾ |
| 8 | 32.6 | 9¼ |

What is claimed is:

1. In the process for laminating a primary and a secondary sheet, the face side of said primary sheet being subject to distortion by pressure or friction, said process comprising applying an adhesive to at least one of the surfaces selected from the group consisting of the back side of said primary sheet and the mating side of said secondary sheet, contacting the mating side of said secondary sheet with the back side of said primary sheet, pressing the primary and secondary sheets firmly together and setting the adhesive, the improvement comprising pressing the primary and secondary sheets firmly together, solely by applying pressure from the back side of said secondary sheet to the primary and secondary sheets under tension by pressure means to prevent distortion of the face side of said primary sheet until at least 50 percent of the terminal bond strength is developed.

2. The process of claim 1 wherein said primary sheet is a pile fabric.

3. The process of claim 1 wherein said primary sheet is a tufted structure of a primary backing material stitched with tufts of yarn.

4. The process of claim 3 wherein said tufts of yarn are at least 0.5 inch long.

5. The process of claim 3 wherein said pressure means has a curved surface.

6. The process of claim 5 wherein said pressure means is a roll.

7. The process of claim 5 wherein said pressure means is a platen.

8. The process of claim 1 wherein said pressure means has a flat surface.

9. The process of claim 3 wherein said pressure means has holes in its surface.

10. The process of claim 3 wherein said pressure means has raised pressure points on its upper surface.

11. The process of claim 10 wherein said pressure means is a continuously curved supporting surface.

12. The process of claim 10 wherein there are holes in said pressure points.

13. The process of claim 3 wherein said adhesive is a hot melt adhesive composition.

14. The process of claim 3 wherein said adhesive is a latex.

15. The process of claim 3 wherein said adhesive is an organic solvent-based adhesive.

16. The process of claim 11 wherein said supporting surface is cooled.

17. The process of claim 11 wherein said supporting surface is heated.

* * * * *